United States Patent
Brisebois et al.

(12)

(10) Patent No.: US 6,359,550 B1
(45) Date of Patent: Mar. 19, 2002

(54) PERSONAL COMMUNICATION DEVICE AND CALL PROCESS STATUS SIGNALLING METHOD

(75) Inventors: Michel A. Brisebois, Gloucester; Marilyn French-St. George, Alcove; Laura A. Mahan; Andre Van Schyndel, both of Kanata, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/288,309

(22) Filed: Apr. 8, 1999

Related U.S. Application Data

(63) Continuation-in-part of application No. 08/822,626, filed on Mar. 20, 1997.
(51) Int. Cl.[7] ............................................. H04B 3/36
(52) U.S. Cl. .............................. 340/407.1; 340/311.2
(58) Field of Search ........................ 340/407.1, 407.2, 340/311.2, 825.44, 825.46, 825.19; 341/21; 455/351, 347; 343/117

(56) References Cited

U.S. PATENT DOCUMENTS

| | | | | |
|---|---|---|---|---|
| 4,520,501 A | * | 5/1985 | DuBruce | 340/407.2 |
| 4,918,438 A | * | 4/1990 | Yamasaki | 340/407.1 |
| 5,391,078 A | * | 2/1995 | Murphy | 434/113 |
| 5,719,561 A | * | 2/1998 | Gonzales | 340/407.1 |
| 6,160,489 A | * | 12/2000 | Perry et al. | 340/825.46 |

* cited by examiner

Primary Examiner—Van T Trieu
(74) Attorney, Agent, or Firm—Angela C. de Wilton

(57) ABSTRACT

An array of stimulators associated with a personal communications device for providing the user with tactile messaging respecting call processing or call network status. The array is positioned on the device so as to be in contact with the user while the terminal is carried or worn, on a wrist, for example. The stimulators of the array, are activated independently so as to provide the user with an encoded message of call processes such as alerting, dial tone, busy signal, etc. Preferably each status is associated with one of a set of unique patterns of operation of the stimulators recognizable by the user as tactile image or pattern of operation, rather than necessitating tactile sensation of individual sequences of each stimulator. Advantageously audio and haptic signalling is synchronised to provide a tactile warning to alert user to impending audio signal, and thereby allow a lower level, i.e. quieter, audio signal to be used, because the user is primed by the tactile signal to expect the audio signalling. Thus the audio threshold for effective signalling is reduced and obtrusiveness of audio signalling in public places may be reduced when used in combination with tactile messaging.

27 Claims, 4 Drawing Sheets

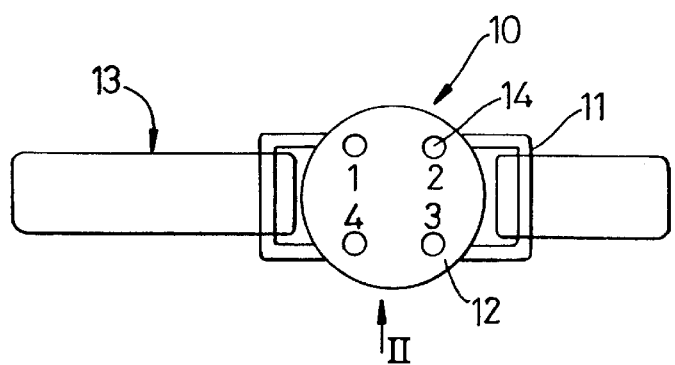
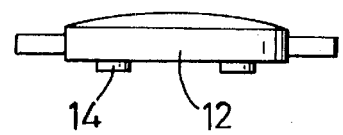
Fig. 1  Fig. 2
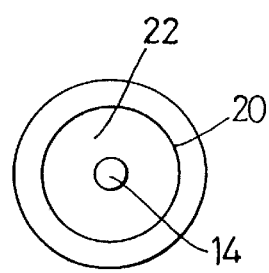
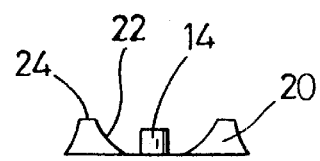
Fig. 3  Fig. 4

PERSONAL COMMUNICATION DEVICE AND CALL PROCESS STATUS SIGNALLING METHOD

This application is a Continuation-In-Part of application Ser. No. 08/822,626 filed Mar. 20, 1997 in the name of M. A. Brisebois et al and entitled "Tactile Array for Encoding of Call Process Status".

FIELD OF THE INVENTION

This invention relates to personal communication devices, and network call process signalling for such devices, and more particularly to a personal communication device having a tactile array for encoding call process status, and a method of encoding call process status using the device.

BACKGROUND OF THE INVENTION

Personal communication devices for wireless services are proliferating. The scope of these devices and services is broadening to include not only traditional telephony based communications, but also Internet and Web based communications. With the proliferation of these device and services, there will be increasing need to provide users with discrete signalling that informs the user of the status of incoming network communications (e.g., incoming call). It is known that the origin of sounds such as those commonly used as alerting signals for wireless devices, is easier to determine if the sound is travelling horizontally rather than vertically. Most conventional wireless terminals, however, are customarily worn at belt level or carried in a handbag at waist level. Thus, if several people in a particular location are carrying wireless terminals and one of the users receives a call, it is not readily apparent to the user whether the alerting signal is coming from his/her terminal or from the terminal of another subscriber in the same location. It may take several rings before the called party realizes that it is his/her terminal that is ringing. This can be extremely annoying to others in the immediate area. Because of the difficulty in detecting the call signal, users may tend to turn up the alerter volume which exacerbates the problem.

In view of the potentially annoying aspects of the alerting signals, it is not uncommon for the facilitators of public events to ban the use of wireless terminals during the event. Similarly, use of such terminals is often discouraged in other noise sensitive areas such as libraries, etc.

Many paging devices use vibration alerting to circumvent this problem. The devices are belt worn, and provide a single vibratory signal to indicate an incoming message. Nevertheless, research suggests that this vibratory signal is often perceived as alarming, rather than informing. People often report that the sensation is one of electric shock. Furthermore in known devices, the signalling is not customizable, and is restricted to notification of an incoming call only.

Accordingly, there is a requirement for alerting and improved notification of call progress for a personal communication device.

Tactile stimulators in communication systems per se are known. For example, U.S. Pat. No. 4,779,615, which issued Oct. 25, 1988, describes an arrangement of individually actuatable stimulators installed in an object such as a chair or bed. The stimulators are used to provide therapeutic stimulation to the body of a user. The stimulators, in one embodiment, are activated in response to a source of music so that the user senses both the sound and "feel" of the music.

In Canadian laid-open application 2,034,763 filed Jan. 23, 1991 and published Jul. 24, 1992, a tactile portable wireless radio transceiver communication system is discussed. The technique, according to the application, is to use a wireless battery operated transceiver unit placed close to the body or held by each operator. The operator sends, by pressing a switch actuator on the transceiver, or receives, by vibration through the skin, a radio frequency signal which activates the vibrating mechanism. The application indicates that, through prearranged sequences of operation, coded information can be transmitted between individuals. Messages are sent and received by vibrations sensed through the skin.

As mentioned above, it is also known to use vibrational action as means for alerting in pagers and the like. These are used to simply notify the wearers of such devices that a page is incoming. One such pager device is described in U.S. Pat. No. 5,488,315 which issued Jan. 30, 1996 to Hedayatnia et al. In the U.S. Pat. No. 5,488,315 patent, a pair of piezoelectric vibrators are driven out of phase to provide an alerting oscillating movement. In the patent, a pair of piezoelectric vibrators are driven out of phase to provide an alerting oscillating movement.

Tactile messaging is also known as means of communication for deaf and/or blind individuals.

Tactile speech encoders for the deaf, for example, as described by Boothroyd in U.S. Pat. No. 4,581,491 provide a spatially distributed tactile array on the skin such that the user may use place of stimulation to extract meaningful speech cues. In addition to using spatial location, each stimulator may be uniquely stimulated at a frequency that corresponds to the extracted fundamental frequency of a particular speech segment. Thus a user may use place of stimulation and frequency of stimulation to extract fundamental frequency information. Since adjacent segments of skin are poorly isolated from one another, and the tactile resolution of the skin is relatively. poor, tactile arrays are necessarily large to avoid cross talk between vibrators.

SUMMARY OF THE INVENTION

It is an object of the present invention to provide a personal communications device wherein stimulators alert the user of call progression status through tactile messaging.

It is a further object of the invention to provide a tactile array comprising a plurality of stimulators which are activated individually to generate encoded messages of call status.

Therefore in accordance with a first aspect of the present invention there is provided a wearable personal communication device comprising an array of actuable stimulators for generating tactile messaging, the device having means for accepting network call status/progression signalling and converting the call status/progression signalling into an encoded message for driving the stimulators in unique patterns associated with call progression signalling.

Preferably each stimulator of the array is independently actuable. Thus, where call progression signalling comprises one of alerting, ringing, dial tone, busy signal, call waiting, called party, ringback, network busy and other indications of call status or network status, each call progression signal generates a unique pattern for actuation of the stimulators of the tactile array.

Thus, the personal communication device comprises a tactile array that provides vibratory pattern information that corresponds to the network status information. In contrast to speech encoding, the design of the device is such as to create a holistic tactile image or recognizable pattern. The user is not expect to extract individual features based on the spatial location or frequency of stimulation of individual transducers. Rather the use will be able to extract a pattern of stimulation based on the temporal and spatial encoding of the transducer array. Typically the pattern will be one of a set of patterns representing each of a plurality of known network status or call status information. Typically this set of patterns will be limited to a set of standard patterns associated with known call status signals that the user will readily be able to recognise.

Beneficially, each user will be able to adjust the amplitude of stimulation to personal requirements, for example to create an informing rather than an alarming signal.

Preferably the stimulators are located within a protective depression, and a dimension such as the diameter of the depression is adjustable to control the tactile sensation by the user.

Advantageously, the personal wearable device provides synchronised audio and tactile signalling of network communication status.

According to an additional aspect of the present invention, audio and tactile (haptic) informing are synchronized so that the overall intrusiveness of any particular sensory modality (audio or haptic) is minimized. This is achieved in two ways. Firstly the tactile signal will precede its accompanying audio signal, thus forewarning the user to expect an auditory signal. This sequence has been demonstrated to reduce the users surprise and perception of alarming rather than alerting. Secondly by synchronizing the subsequent audio and haptic events, the overall level, or amplitude, of the audio signal may be reduced, since the user will now be primed to expect a personal alert. Thus the sound level of audible alerts may be significantly reduced to avoid general disturbance in public areas, while still reaching the threshold to effectively alert the user to call or network status.

Furthermore, recognition of tactile patterns is assisted by the synchronization with conventional, familiar, audio signalling.

In accordance with a further aspect of the present invention, there is provided a method of signalling one of a plurality of call progression status signals to a user of a wearable personal communication device having an array of actuatable stimulators for generating tactile messaging, comprising the steps of: accepting network call status/progression signalling, converting the call status/progression signalling into an encoded message and driving the stimulators in a unique pattern associated with an individual call progression status signal.

Preferably, the method comprises independently driving each stimulator of the array to generate a vibratory pattern corresponding to the network status information Thus, where call progression signalling comprises one of alerting, ringing, dial tone, busy signal, call waiting, called party, ring-back, network busy and other indications of call status or network status, the method comprises generating a unique pattern for each of these call progression signals.

BRIEF DESCRIPTION OF THE DRAWINGS

Embodiments of the invention will now be described with reference to the attached drawings wherein:

FIG. 1 is a representation in plan, of a tactile array according to an embodiment of the present invention;

FIG. 2 is a cross-sectional view of the array of FIG. 1;

FIG. 3 is a plan view of one example of a vibrating element with a protective depression;

FIG. 4 is a cross sectional view of the element of FIG. 3; and

DETAILED DESCRIPTION

Figure 5:
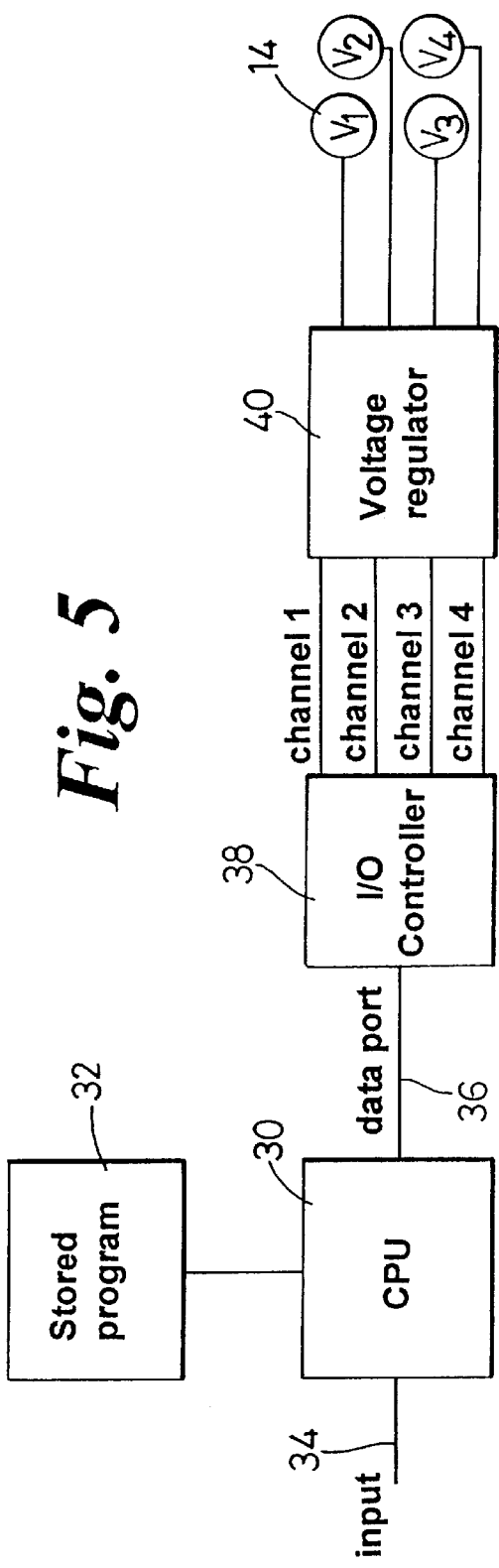
FIG. 5 is a block diagram of a circuit to power the vibrating elements.

For the purposes of the following description the personal communication device is a wearable device such as might be worn on a user's wrist similar to a wrist watch. It is to be understood, however, that the invention is not limited to a wrist worn device but may be incorporated in other personal communication devices as long as the array is able to impart tactile messaging to a user. Such other devices may include, for example, neck worn devices (Nortel's Soundbeam), hand carried devices or other wearable personal communication devices worn or carried in contact with or in close proximity to the user's skin.

As shown in FIG. 1, a device 10 has a shape similar to a wristwatch, with fastening means 11 for receiving a strap or band 13 to retain the device on a wearer's wrist. The wireless functionality is not shown, but it is to be understood that the device may have the ability to transmit and/or receive voice or data messages via radio signalling. In a simplified embodiment, the wrist-worn device might be used solely to provide call progression status while the actual voice/data communication would be conducted with a conventional personal communication device in communication with the wearable device 10. Thus, in the environment wherein normal alerting is objectionable, the user of the system(i.e. a conventional personal communication device) would be alerted by the tactile array e.g. that an incoming call was available, or other network status signalling.

The tactile signal may be the only signal received by the user, or alternatively, the tactile signal may be synchronised with an audio signal. Synchronization of audio and haptic signalling is not precluded by physically separating the audio and tactile (haptic) components of the system, i.e. they may be separate units, preferably in wireless communication with one another. Consequently, current telecommunications equipment may be supplemented by the haptic device to support call status notification or network signalling.

In another embodiment, the tactile array may be part of the actual communications terminal.

In each embodiment, the tactile array is used to provide signalling such as dial tone, dialling, ring back, called party busy, network busy, call waiting, ringing, and hold, in addition to alerting and other network progression/status signalling.

The device 10 of the first embodiment has, on the back 12 or other suitable locations, an x-y array of four stimulators 14 which are individually actuatable and which are spaced apart generally as shown in the example of FIGS. 1 and 2.

The stimulators, in the first embodiment are piezoelectric devices which vibrate in response to an electric signal. It is also contemplated that piezoelectric vibrators in combination with mechanically vibrating pins or the like may be employed. Electro-mechanical vibrators are also contemplated by the invention.

In the case of mechanically vibrating pins or electromechanical devices, the tactile alerting elements are preferably positioned within protective depressions 20 as shown generally in FIGS. 3 and 4. In this way the vibrating elements only come in contact with the user's skin when an encoded signal is being delivered. The vibrating elements may have rounded, flat, pointed, etc. tops and may be positioned so as to make contact with the wearer's skin or be positioned such that movement of the elements is sensed by the wearer. The depression or cavity 22 in which the vibrating elements 14 are positioned may have a flat bottom or may be curved, rounded etc. The rim 24 of the depression will normally be flat and smooth so as not to take away from the sensation imparted by the vibrating element. The diameter of the depression may be the order of a millimeter to several millimeters depending on the application.

The diameter of the rim 24 surrounding the depression may be made adjustable so as to provide the wearer the ability to optimize the tactile sensation. It has been found that the sensation felt by the wearer is dependent on several factors including vibration frequency, vibration amplitude, location of vibrating elements relative to each other and in relation to the user. A change in the diameter of the rim of the stimulator was found to have a particular noticeable effect on sensation to many users. The shape of the cavity 22 also has an impact on the imparted sensation.

Figure 6:
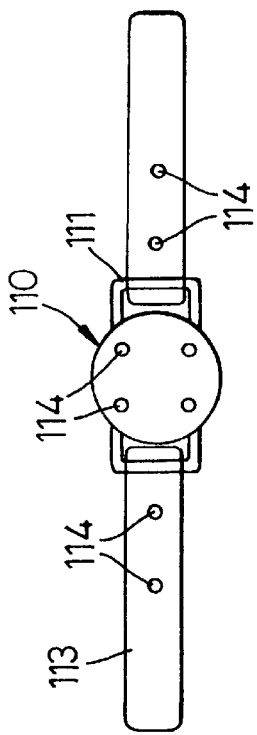
FIG. 6 illustrates another embodiment of the invention.

It be understood that the stimulators may be otherwise positioned or arranged. For example, the stimulators could also be positioned on the strap or band as shown in FIG. 6, used to hold the device on the user's wrist. In this example, two stimulators 114 could be on the back of a device 110 and two other stimulators 114 spaced apart on a band 113, or an alternative number may be provided.

Alternatively, all of the stimulators might be distributed along the length of the band. It will be apparent to one skilled in the art that the vibrator configuration, number of stimulators, location, and spacing will be varied depending on the shape, size and function of the communication device in which the alerting array is incorporated.

The personal communication device accepts call progression signalling such as alerting or ringing, dial tone, busy, etc., and converts this signalling into an respective encoded message, which drives the stimulators in unique pattern associated with each individual call status signal.

The variables for stimulator activity include onset, offset, duration, amplitude, frequency and activation patterns. The aforementioned variations are used to signal to the user in a tactile manner different call progression status, for example, a sequential activation of each stimulator could be used to signal to the user an incoming call. The tactile message may be used alone, instead of an audible signal, or in combination with an audible alerting tone.

The actual manner in which the various call progression status is encoded for tactile messaging is not critical, but from an implementation consideration, the most easily recognizable sequences are used in connection with the most common status features. For example, it may be easy to recognize a tactile pattern wherein each stimulator in the array is activated sequentially. In other words, the four stimulators of the array shown in FIG. 1 are each activated for a set time in a clockwise sequence.

FIG. 5 is a block diagram of a circuit used to drive the four vibrating elements independently. As shown the circuit includes a central processor unit (CPU) 30 which operates according to a stored program 32. The stored program sets the sequence in which the vibrating elements are activated as well as the duration of the activation. The CPU also has an input port 34 for receiving data as to the nature of the encoded tactile message that is to be delivered. As previously indicated, this may be an alerting signal or a busy signal, or other network status signal. The stored program is downloaded via the dataport 36 to an I/O controller 38 which separates the encoded message into the four individual signals for each channel. These individual signals are regulated by voltage regulator 40 and then to the vibrating elements 14 which may be piezoelectric vibrators.

FIGS. 8A–G illustrate the scope of signalling envisaged. Onset, offset, frequency of stimulation and duration of stimulation are under designer control. Duration of signals are under network control, and are responsive to a set of known network signalling or call status signals which are received by the personal communications device and encoded to activate the stimulators to provide tactile messages. The amplitude and overall onset and offset characteristics may be set under user control.

Figure 7:
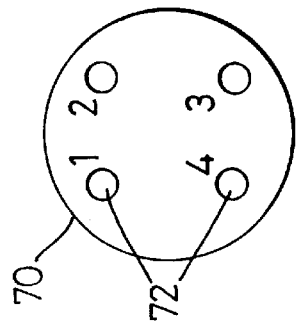
FIG. 7 illustrates an array of four stimulators.

Examples of signalling and tactile messaging is illustrated for a simple array 70 of four stimulators 72 arrange as shown in FIG. 7.

Figure 8A:
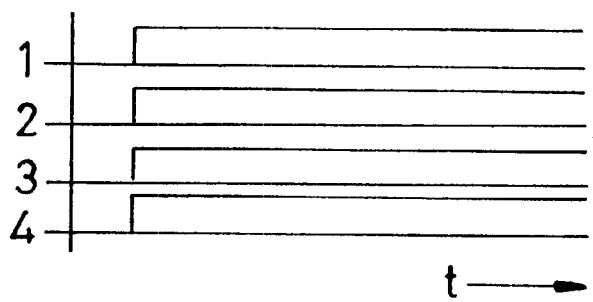
FIGS. 8A-G illustrate examples of call status encoding showing independent activation sequences of each of the stimulators of x-y array of four stimulators.
Figure 8B:
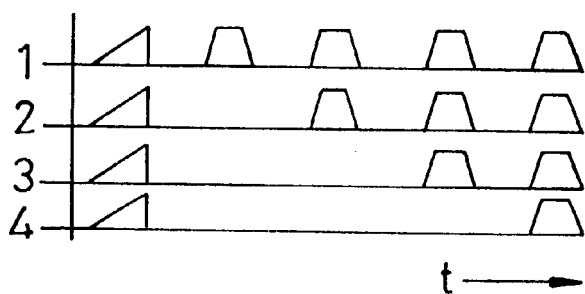
Figure 8C:
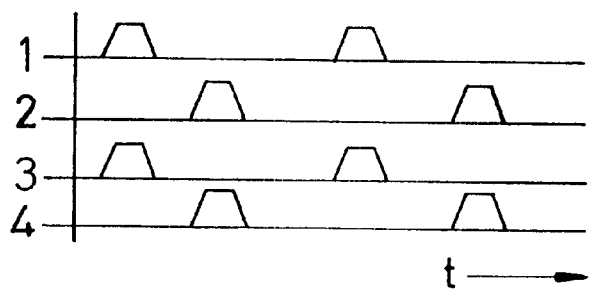

A dial tone is represented as a tactile message by activating all four stimulators simultaneously, as long as dial tone is present, as indicated schematically in FIG. 8A.

A ringing tone signal is represented as a tactile message by activating the four stimulators simultaneously with slowly increasing amplitude to provide a gentle tactile 'warning' signal corresponding to a warning beep, followed by a sequence of triggering the stimulators sequentially so that each additional ring add another stimulator. After four rings the latter sequence restarts as long as dial tone is present, as indicated schematically in FIG. 8B.

A called party signal is represented as a tactile message by activating stimulators 1 and 3 together followed by stimulators 2 and 4. The period of stimulation of vibrators 1 and 3 corresponds to the period of the audio busy signal sequence, as indicated schematically in FIG. 8C.

Figure 8D:
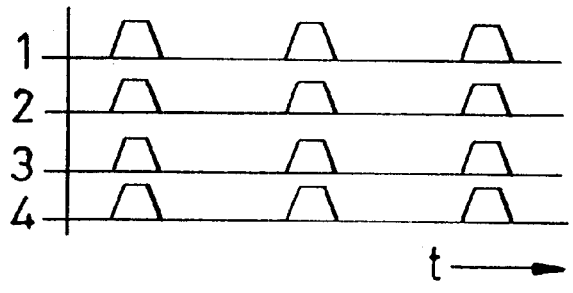

A ring back signal is represented as a tactile message by activating all four stimulators to vibrate together simultaneously according to the ring back sequence of the corresponding audio signal, as indicated schematically in FIG. 8D.

Figure 8E:
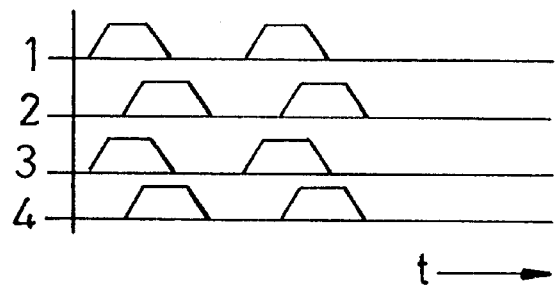

A network busy signal is represented as a tactile message by activating all two stimulators 1 and 3 which stay on until after stimulators 2 and 4 are activated, as indicated schematically in FIG. 8E, the period of activation corresponding to periods of associated audio signal.

Figure 8F:
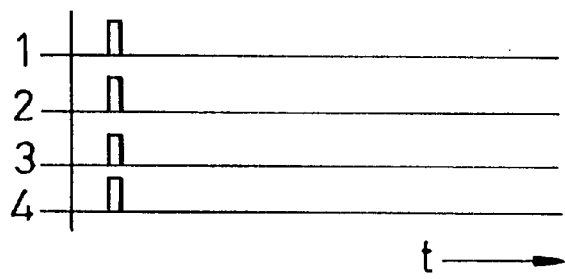

A call waiting signal is represented as a tactile message by activating all four stimulators to vibrate together simultaneously according very briefly, to create a tactile perception similar to an audible a click as indicated schematically in FIG. 8F.

Figure 8G:
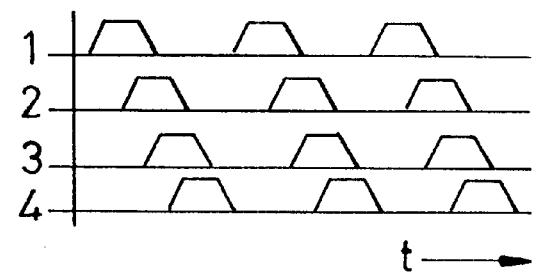

A searching the network signal is represented as a tactile message by activating each stimulator sequentially and the onset of one precedes the onset of the next, and the cycling speed represents the anticipated duration of the search, as indicated schematically in FIG. 8G.

While examples of sequences have been illustrated for an array of 4 stimulators, another number of stimulators and alternative arrangement of stimulators may alternatively be used. Alternative sequences of activation may be associated with each call status/progression signal.

Although specific embodiments of the invention has been shown and described in detail, it will be understood that various modifications may be made without departing from the invention defined in the following claims.

What is claimed is:

1. A personal communication device capable of audio messaging and comprising a wearable unit carrying an array of actuatable stimulators for generating tactile messaging, the device comprising:
   means for accepting network status and call progression signalling from a communications network,
   means for generating audio signals indicating individual network status and call progression signals, and
   means for converting the network status and call progression signalling into an encoded message for driving the stimulators in unique patterns providing a tactile signal associated with a corresponding audio signal indicating network status and call progression signals, the duration and sequence of each unique pattern being under network control and synchronized with associated audio signals,
   whereby network status and call progression signalling is provided by synchronized audio messaging and tactile messaging.

2. A device according to claim 1 wherein tactile messaging precedes audio messaging of network status and call progression signalling.

3. The device of claim 1 wherein the network status and call progression signalling comprises one of alerting, ringing, dial tone, busy signal, call waiting, called party, ringback, network busy, and other indications of call status or network status.

4. The device of claim 1 wherein each network status and call progression signal is associated with a tactile encoded message corresponding to a unique pattern.

5. The device of claim 1 wherein individual stimulators of the array of stimulators are independently actuatable.

6. The device of claim 5 wherein each stimulator comprises a piezoelectric vibrator.

7. The device of claim wherein the array of stimulators comprises a plurality of electro-mechanical vibrators.

8. The device of claim 5 wherein at least one of said individual stimulators being located within a protective depression.

9. The device of claim 8 wherein the diameter of said protective depression is variable.

10. A device according to claim 1 comprising wrist worn unit carrying the array of stimulators for providing a user with tactile messaging.

11. The device of claim 1, wherein the array of stimulators comprises independently actuatable stimulators positioned for direct contact with a user of said device, the stimulators being actuatable by electro-mechanical means whereby tactile call process status messaging is delivered to said user.

12. The device of claim 11 being a wrist worn device.

13. The device of claim 12 wherein the stimulators are located in a spaced relationship on the back face of the device.

14. The device of claim 13, having an associated band for securing said device to a user's wrist, at least one of said stimulators being located on the band.

15. The device of claim 1 wherein the stimulators provide tactile messaging preceding audio messaging.

16. The device of claim 1 intended to be worn around a user's neck.

17. The device of claim 1 intended to be carried in a user's hand.

18. A method of signalling one of a plurality of network status and call progression status signals to a user of a personal communication device capable of audio messaging and comprising a wearable unit carrying an array of actuatable stimulators for generating tactile messaging, the method comprising:
   accepting network status and call progression signalling from a communications network,
   generating an audio signal indicating network status and call progression signalling, and
   converting the network status and call progression signalling into an encoded message for driving the stimulators in unique patterns providing a tactile signal associated with the corresponding audio signal indicating network status and call progression signals, the duration and sequence of each unique pattern being under network control and synchronized with associated audio signal.

19. A method according to claim 18 comprising providing the tactile signal preceding the associated audio signal, and subsequently providing synchronized audio and tactile signals.

20. The method of claim 18 comprising independently driving each stimulator of the array to generate a vibratory pattern corresponding to each call process status signal.

21. The method according to claim 18 wherein network status and call progression signalling comprises one of alerting, ringing, dial tone, busy signal, call waiting, called party, ringback, network busy, and other indications of networks status or call progression status.

22. The method of claim 21 comprising generating a unique pattern for each respective status signal.

23. The method of claim 22 comprising independently driving each stimulator of the array to generate a vibratory pattern corresponding to each respective status signal.

24. The method of claim 18 comprising detecting signalling to said device;
   converting said signalling into and encoded message comprising digitally encoded data; and
   actuating the stimulators by supplying said encoded data to the array of actuatable stimulators.

25. A method as defined in claim 24 comprising independently actuating individual stimulators.

26. A method according to claim 18 comprising spatially and temporally encoding the tactile signal to correspond to conventional audio signals indicating network status and call progression signalling.

27. A personal communication device capable of audio messaging and comprising a wearable unit carrying an array of actuatable stimulators for generating tactile messaging, the device comprising:
   an input for accepting network status and call progression signalling from a communications network
   a processor for generating audio signals indicating individual network status and call progression signals, and for converting the call process status signalling into an encoded message for driving the stimulators in unique patterns providing a tactile signal associated with a corresponding audio signal indicating network status and call progression signals, the duration and sequence of each unique pattern being under network control and synchronized with associated audio signals,
   whereby network status and call progression signalling is provided by synchronized audio and tactile messaging.

* * * * *